Joseph R. Owen
INVENTOR.

BY Harvey A. David
John M. Pease
Attorneys

June 23, 1970 J. R. OWEN 3,517,122

SELECTIVE IMAGE OBLITERATION
IN ELECTRONIC SYNTHESIZERS

Filed March 27, 1968 2 Sheets-Sheet 2

Joseph R. Owen
INVENTOR.

BY Harvey A. David
John M. Pease
Attorneys

United States Patent Office 3,517,122

Patented June 23, 1970

3,517,122
SELECTIVE IMAGE OBLITERATION IN ELECTRONIC SYNTHESIZERS

Joseph R. Owen, Orlando, Fla., assignor to the United States of America as represented by the Secretary of the Navy

Filed Mar. 27, 1968, Ser. No. 716,649

Int. Cl. H04n *3/16;* F41g *3/26*

U.S. Cl. 178—6.8 3 Claims

ABSTRACT OF THE DISCLOSURE

A system for synthesizing a television picture from a source of background video signals having high and low amplitude video information corresponding to the sky and sea or earth, respectively, and a source of target or object video signals to provide horizon effects simulating obscuring of those portions of the object which would be obscured at the simulated range, the system being characterized by a horizon effects generator including background video to logic level conversion means, filter and monostable multivibrator means for eliminating effects of spurious white areas in the sea area of the background, and sample and hold means operative to hold so long as a predetermined pulse is received from the multivibrator means at least once for each line of scan, and range comparison and gate means for blanking such portion of target video signals as occur during holding of the sample and hold circuit while the object is at a range beyond the horizon range.

BACKGROUND OF THE INVENTION

This invention relates to the art of electronically synthesizing scenes for display on a cathode ray kinescope (television) by the technique of inserting object or target images represented by video signals from one source into a background scene represented by video signals from another source. This art is notably useful in the field of training devices or simulators, for example in periscope simulation as disclosed in U.S. patent applications Ser. No. 580,835, filed Sept. 20, 1966, now U.S. Pat. 3,420,953, and Ser. No. 613,980, filed Feb. 1, 1967, both by Hanns H. Wolff and assigned to the assignee of this application.

A typical image is that of a ship apparently floating in a background seascape on the viewing face of a cathode-ray kinescope. In order to simulate increasing range, the image of the ship is electronically caused to decrease in all principal dimensions. Now, in addition to this it is desirable that as the simulated range of the ship is increased from the viewer beyond the distance of the horizon from the viewer, the image of the ship should begin to disappear, beginning at the waterline and working upwards as the range continues to increase. The portion of a ship which will be obscured to a viewer with a given periscope height above the water and a given distance of the ship beyond the horizon may be readily calculated or may be derived from tables well known to those skilled in the arts to which the invention pertains.

It has been proposed in the mentioned patent application Ser. No. 613,980, to accomplish this successive obliteration through the use of a blanking circuit which is triggered by a video signal generated by scanning a horizon identifying strip or marker on a background scene or transparency which is scanned by one television camera while a picture or scene including a target ship is scanned by another camera, the blanking circuit being operative to blank that portion of the target ship which should be obscured by the horizon. Further details of that blanking circuit and the synthesis of a scene from the outputs of the two scanning cameras may be had by reference to the aforementioned applications.

SUMMARY OF THE INVENTION

With the foregoing in mind, it is a principal object of the present invention to provide an improved blanking circuit for use in synthesizing a television scene simulating the obscuring of a portion of a ship or other object by the earth's curvature when the ship or object is beyond the horizon.

It is another object of this invention to provide a novel blanking circuit for simulating horizon effects in synthesized kinescope displays, which circuit does not require a horizon marking indicator nor the generation of a video signal indicative of the horizon other than the inherent difference between the video levels representative of the sky and the sea.

As another object the invention aims to accomplish the foregoing through the provision, in a system for synthesizing a cathode-ray kinescope or television picture, of horizon effects generating means including background video to logic level conversion means, filter and monostable multivibrator means for eliminating effects of spurious white areas in the sea area of the background, and sample and hold means operative to hold so long as a predetermined pulse is received from the multivibrator means at least once for each line of scan, and range comparison and gate means for blanking such portion of target video signals as occur during holding of the sample and hold circuit while the object is at a range beyond the horizon range.

BRIEF DESCRIPTION OF THE DRAWINGS

Other objects and many of the attendant advantages of this invention will be readily appreciated as the same becomes better understood by reference to the following detailed description when read in conjunction with the accompanying sheets of drawings forming a part of this specification, and in which.

DESCRIPTION OF THE PREFERRED EMBODIMENT

Figure 1:
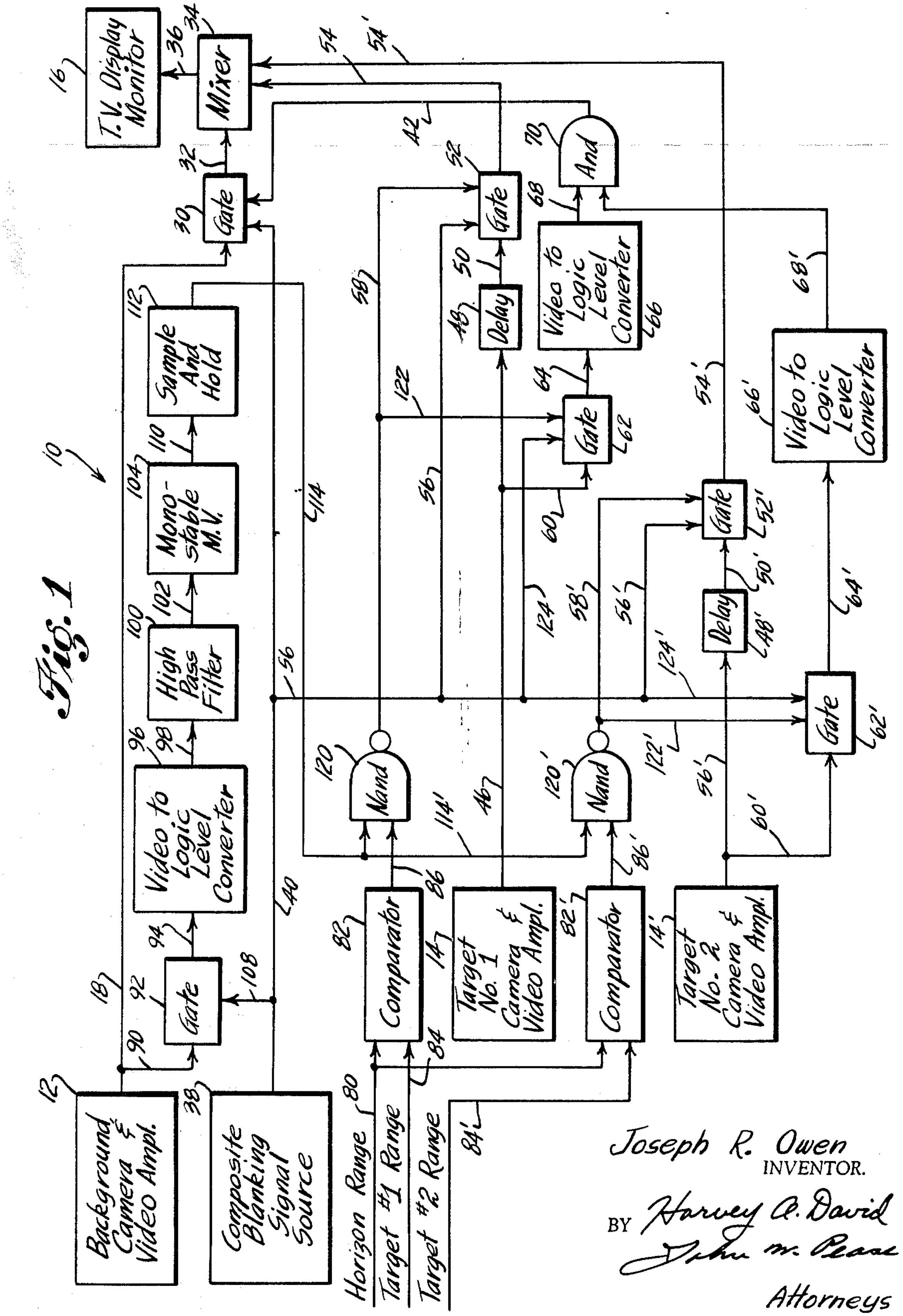
FIG. 1 is a diagrammatic illustration in block form of a picture synthesizing system embodying the present invention.

In the form of the invention illustrated in the drawings and described hereinafter, there is provided a system, generally indicated at 10 in FIG. 1, for use in synthesizing a cathode-ray kinescope scene from a source 12 of background video signals and one or more sources 14, 14' of object or target video signals which scene may be displayed on a television monitor such as monitor 16. In the example being described, the sources 12, 14 and 14' of video signals are in the form of television cameras, together with their respective amplifiers, for scanning a background scene and a plurality of ship targets which will be hereafter referred to as target number 1 and target number 2.

Figure 2:
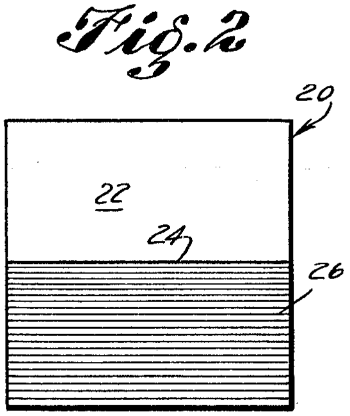
FIG. 2 is an illustration of background video display including sky and sea areas.

The background video signals provided on output line 18 from the background camera source 12 are representative of sky and sea in a usual seascape, and when presented alone in a raster 20 as illustrated in FIG. 2, the upper (light) area 22 is separated by the horizon 24 from the lower (dark) area 26. For each horizontal scanning line (typically 32 microseconds in overall length with 28 microseconds scansion and 4 microseconds retrace), there is maximum amplitude (white) video information in the area 22, and a lesser amplitude (gray) in the area 26. This difference in background video amplitude is utilized in the system 10 in a manner which will be made apparent as the description proceeds to effect blanking of a portion of a target which would naturally be obscured from view by the effect of the earth's curvature.

The background camera source output (background video) is connected, as represented by flow line 18, to a gate 30 which is in turn connected by line 32, a video mixer 34, and a line 36 to the display monitor 16. The gate 30 provides the function of a normally closed single pole, single throw switch which can be opened in response to various commands described hereinafter to interrupt or inhibit the background video signal flow to the monitor 16. One of these commands consists of composite blanking signals derived from a source 38 via line 40 and which signals serve to blank out transients in the video signals at the beginnings and endings of the mentioned scansion and retrace intervals. While these blanking signals are desirable to provide an uncluttered display, their use forms no actual part of the invention per se. Suffice it to say that they are mentioned as forming part of a preferred system embodying the invention.

Another command which will cause gate 30 to inhibit the passage of background video is applied to gate 30 via line 42 and is derived from the presence of target video signals from one of the target camera sources 14 or 14' for those portions of the respective ships or targets which would be visible to a viewer through a periscope having a predetermined range to the horizon. Thus, the command signals arriving at gate 30 via line 42 are calculated to cause the gate 30 to inhibit the background video and create a "slot" therein of the proper shape to have inserted in the display the image of the portion of the target which promoted the slot, all as will become apparent as the description proceeds.

The target video source 14 has its output connected by line 46, a delay means 48, a line 50, a gate 52, a line 54, mixer 34, and line 36 to the monitor 16. The gate 52 functions as a normally closed single pole switch which, upon certain commands will inhibit passage of the target video to the mixer for display on the monitor. One of these commands consists of the composite blanking signal which operates to eliminate transients in the same manner as explained with reference to gate 30. This command is received via line 56. Another command, later described in detail, is received via line 58 and serves to cause the gate 52 to inhibit the passage of target video for portions of the target which would be obscured by the horizon when the simulated range of the target is greater than the simulated range to the horizon from the viewer.

Figure 3A:
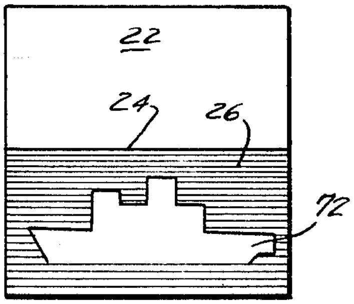
FIGS. 3*a*–3*b* illustrate pictures synthesized by the system of FIG. 1, showing a target at a range substantially less than the range to the horizon, at a greater range but still something less than the range to the horizon, and at a range greater than the range to the horizon.
Figure 3B:
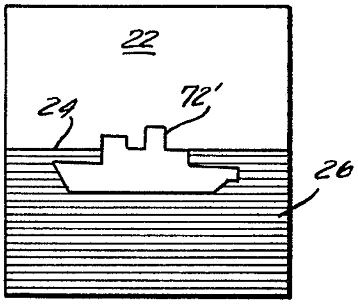

The target video from source 14 is also conveyed via a line 60 to a gate 62 which functions as a normally closed switch to pass the target video via a line 64 to a video to logic level converter 66. This converter 66 comprises an amplifier which provides essentially no output for video inputs below a given threshold level, and a predetermined elevated level of output for all video greater than that threshold level. Such logic level converters per se are well known to those skilled in the art to which the invention pertains. The output and converter 66 is connected by line 68 as one input to an AND gate 70. When the output on lines 68 and 68' are characteristic of the presence of target video from logic level converters 66 and 66' at a given time, the gate 70 provides an inhibit command on line 42 to gate 30 and the background video thereby has an appropriate "slot" formed therein to receive the target video passed by gate 52. It is the purpose of the delay 48 to match the time of arrival of the target image and the slot on the display. Such is the case when a target ship is at a range substantially less than the range of the viewer's horizon in the situation being simulated, and the target ship image will appear as at 72 in FIG. 3*a*.

The system 10 includes means for obscuring part or all of the image of the target ship when its range is beyond the range from the viewer to the horizon. To this end, the simulated range to the horizon is represented by an analog voltage generated in a manner described in the previously mentioned applications and is applied via a line 80 as one input to a comparator 82. This voltage will usually remain fixed as it depends upon the periscope height and the vertical dimensions of the target. The other input to the comparator 82 consists of an analog voltage applied thereto via line 84 and which is representative of the range of the target from the viewer (or viewer's periscope). When the analog voltage on line 84 represents a target range less than the horizon range, the output of the comparator 82 on line 86 has one character, e.g. a predetermined voltage level. When the analog voltage on line 84 represents a target range greater than the horizon range, the output of the comparator has a different character, e.g. a zero voltage level.

The output of the comparator 82 is used in conjunction with horizon effects generating means to produce the desired blanking of portions of the target image which would be obscured by the horizon.

Thus, background video from source 12 is conducted via lines 18 and 90, a gate 92, and a line 94 to a video to logic level converter 96. The latter is similar to the converter 66 but operates at a different threshold level to provide on line 98 an output which is characteristic of presence of video above a threshold level which represents the horizon between sea and sky. That is to say, when the maximum amplitude (white) video of area 22 of FIG. 2 is present in the background video signal, one characteristic voltage level is produced on line 98, and when video of lesser amplitude as in area 26 is present, the output is characterized by zero voltage.

The output of the converter 96 is passed via line 98 to a high pass filter 100, which is in turn connected by line 102 to a monostable multivibrator 104. The filter 100 in essence comprises a capacitance which will permit triggering of the multivibrator 104 only by output of the converter 96 characteristic of maximum amplitude video having a duration greater than a predetermined time period on the order of ten microseconds. In other words, the multivibrator is made insensitive by the converter 96 and filter 100 to gray levels and any video pulse with a duration less than ten microseconds.

The multivibrator is allowed to reset automatically by the operation of the composite blanking signals on gate 92 via line 108 which cause this gate to inhibit the flow of video signals during the approximately four microsecond retrace interval. Thus, the multivibrator considers the background video on a line by line basis as to the presence of maximum amplitude video signals of greater than ten microseconds duration which, of course, is characteristic only of the sky portion 22 of the background.

The monostable multivibrator 104 has its output conducted via line 110 to a sample and hold circuit 112. This sample and hold circuit is triggered by output of the multivibrator 104 from a no-hold condition, represented on line 114 for example by zero voltage, to a holding condition represented on line 114 by a predetermined voltage level. The latter condition is maintained indefinitely so long as the multivibrator provides at least one output pulse for each 32 microseconds of horizontal scan. Or, stated another way, one output pulse for each line of horizontal scan.

When there is a partial loss of video, such as in crossing the horizon 24 from the maximum amplitude sky area 22 to the gray amplitude of the sea area 26 of FIG. 2, the monostable multivibrator 104 is not triggered so that the sample and hold circuit 112 does not hold. The resulting output on line 114 from the sample and hold circuit is characteristic of the background scan being below the horizon and conditions a NAND gate 120 to provide a desired inhibit command via line 58 to gate 52 if and when the output on line 86 is characteristic of the target range being greater than the horizon range. The inhibit command so applied to gate 52 interrupts or blanks that portion of the target video which is below the horizon.

Figure 3C:
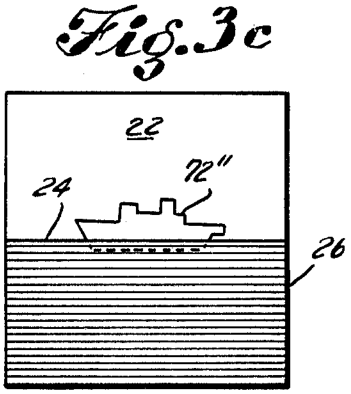

Simultaneously, the inhibit command on line 58 is applied via line 122 to the gate 62, thereby interrupting target video signals from source 14 to the video to logic level converter 66. Such interruption of the target video signal causes the converter 66 to remove from line 68 the output which is characteristic of target video, whereupon the inhibit command which would otherwise have been applied via line 42 to gate 30 is presented. This is necessary so that the area of background below the horizon which would have been blanked to provide a slot to accept the target will not be blanked but will be present to simulate the effect of the lower portion of the target being obscured by reason of the earth's curvature. The resulting ship image 72″ is shown in FIG. 3*c*, with the blanked portion thereof indicated by a dotted line.

It may be noted at this time that gate 62 is also subject to the composite blanking signals which are applied thereto via line 124.

The invention contemplates the synthesis of scenes or pictures wherein there are more than one simulated target. Hence the provision of the target video source 14′ which provides on line 46′ target video signals for a second or number two target. The elements of the system 10 which relate to the number two target are duplicates of those relating to the number one target as described heretofore. Accordingly, corresponding elements are denoted by corresponding reference numerals with the addition of prime marks and full understanding of the operation thereof may be had by reference to the foregoing description relating to the first target.

From the foregoing detailed description it will be appreciated that the system 10 embodying the present invention accomplishes the objects and advantages previously set forth, as well as others.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A system for synthesizing cathode-ray kinescope or television pictures from a source of background video signals having high and low amplitude video information corresponding respectively to the sky and to sea or earth, and a source of target video signals, said system comprising:

first gate means (30) connected to receive background video signals from said source (12) thereof;

mixer means (34) connected to receive said background video signals from said first gate means;

display means (16) connected to receive video signals from said mixer and form target and background images;

second gate means (52) connected to receive target video signals from said source (14) thereof;

said mixer means being connected to receive target video signals from said second gate means for display at said display means;

third gate means (62) connected to receive target video signals from said source (14) thereof;

first video to logic level converter means (66) connected to receive target video signals from said third gate means and operative to provide outputs which are characteristic of presence or absence of target video as detected by said first video to logic level converter means;

fourth gate means (70) connected between said first converter means and said first gate means and operative in response to output of said first converter means characteristic of target video to apply an inhibit command to said first gate means;

fifth gate means (92) connected to receive background video signals from said source (12) thereof;

second video to logic level converter means (96) connected to receive background video signals when passed by said fifth gate means and operative to produce an output characteristic of background video signals of amplitude greater than a predetermined level representative of sea or earth;

high pass filter means (100) connected to receive the output of said second converter;

monostable multivibrator means (104) connected to receive the output of said filter means, whereby said multivibrator means is responsive to provide an output pulse only for outputs of said second converter means which are of greater duration than a predetermined minimum duration;

sample and hold means (112) connected to receive the output pulses of said multivibrator means and operative to hold a first output condition so long as it receives at least one of said pulses from said multivibrator means for each line of horizontal scan of said background video signals, and operative to revert to a second output condition when a line of horizontal scan occurs without one of said pulses;

sixth gate means (120) connected between said sample and hold means and said second gate means;

comparator means (82) responsive to horizon range analog signals and to target range analog signals to provide a first output condition characteristic of horizon range greater than target range, and a second output condition characteristic of horizon range not greater than target range, said comparator means being connected to said sixth gate means;

said sixth gate means being responsive to coincidence of said second output condition of said sample and hold means and said second output condition of said comparator means to apply an inhibit command to said second gate means and to said third gate means, whereby the portion of said target image is obliterated which would be beyond the horizon, and the background image is displayed in place of the obliterated portion of the target image.

2. A system as defined in claim 1 and further comprising a second source (14′) of second target video signals;

seventh gate means (52′) connected to receive second target video signals from said second source, said seventh gate means being normally operative to pass second target video signals from said second source to said mixer means for passage to said display means;

eighth gate means (62′) connected to receive second target video signals from said second source;

third video to logic level converter means (66′) connected to receive second target video signals from said eighth gate means and operative to provide output conditions which are characteristic of presence or absence of second target video as detected by said third video to logic level converter means;

said fourth gate means being connected to said third video to logic level converter and responsive to said output condition thereof characteristic of presence of second target video to apply an inhibit command to said first gate means;

ninth gate means (120′) connected between said sample and hold means and said seventh gate means;

a second comparator means (82′) responsive to said horizon range analog signals and to second target analog range signals to provide a first output condition characteristic of horizon range greater than second target range, and a second output condition characteristic of horizon range not greater than second target range, said second comparator being connected to said ninth gate means;

said ninth gate means being responsive to coincidence of said second output condition of said sample and hold means and said second output condition of said second comparator means to apply an inhibit command to said seventh gate means and to said eighth gate means, whereby the portion of said second target image is obliterated which would be beyond the horizon, and the background image is displayed in place of the obliterated portion of the second target image.

3. A system as defined in claim 2, and wherein:

said fourth gate means comprises an AND gate responsive to coincidence of output conditions of both of said first and said third video to logic level converters characteristic of absence of target video signals as seen thereby to withhold said inhibit command from said first gate means.

References Cited

UNITED STATES PATENTS

| | | | |
|---|---|---|---|
| 3,234,665 | 2/1966 | Sear et al. | 35—25 |
| 3,299,536 | 1/1967 | Sear | 35—25 |
| 3,319,248 | 5/1967 | Balding. | |

ROBERT L. GRIFFIN, Primary Examiner

D. E. STOUT, Assistant Examiner

U.S. Cl. X.R.

35—10.2, 12, 25; 343—5; 340—27